US010694801B2

(12) United States Patent
Cooke (10) Patent No.: US 10,694,801 B2
(45) Date of Patent: Jun. 30, 2020

(54) ELECTRONIC MOTORCYCLE HELMET

(71) Applicant: Bruce Cooke, Willingboro, NJ (US)

(72) Inventor: Bruce Cooke, Willingboro, NJ (US)

( * ) Notice: Subject to any disclaimer, the term of this patent is extended or adjusted under 35 U.S.C. 154(b) by 343 days.

(21) Appl. No.: 15/718,773

(22) Filed: Sep. 28, 2017

(65) Prior Publication Data
US 2018/0014597 A1 Jan. 18, 2018

Related U.S. Application Data

(60) Provisional application No. 62/400,659, filed on Sep. 28, 2016.

(51) Int. Cl.
*G08G 1/054* (2006.01)
*A42B 3/04* (2006.01)
(Continued)

(52) U.S. Cl.
CPC .......... *A42B 3/0426* (2013.01); *A42B 3/042* (2013.01); *A42B 3/0433* (2013.01); *A42B 3/0453* (2013.01); *A42B 3/0493* (2013.01); *A42B 3/222* (2013.01); *A42B 3/226* (2013.01); *A42B 3/283* (2013.01); *A42B 3/286* (2013.01); *A42B 3/30* (2013.01); *A42B 3/303* (2013.01); *A62B 7/10* (2013.01); *A62B 18/08* (2013.01); *G06F 3/165* (2013.01); *H04N 5/2252* (2013.01);
(Continued)

(58) Field of Classification Search
CPC ......... A42B 3/0426; A42B 3/046; A42B 3/30; A42B 3/042; A42B 3/0433; A42B 3/0453; A42B 3/0493; A42B 3/222; A42B 3/226; A42B 3/283; A42B 3/286; A42B 3/303; G08B 25/016; G08B 7/06; A62B 18/08; A62B 7/10; G02B 2027/0138; G02B 2027/014; G02B 27/017; G06F 3/165; G08G 1/137; G08G 1/166; G08G 1/167; G08G 1/205; H04N 5/2252; H04N 5/23206; H04N 5/23293; H04N 5/247; H04R 1/028; H04R 1/1033; H04R 1/1041; H04R 1/326; H04R 2420/07; H04R 3/005
USPC ..... 340/937, 995.26, 995.27, 427, 432, 905, 340/691.6, 693.3, 693.7
See application file for complete search history.

(56) References Cited

U.S. PATENT DOCUMENTS

8,692,886 B2  4/2014 Ennis
9,247,779 B1 * 2/2016 Aloumanis ............ G08G 1/137
(Continued)

*Primary Examiner* — Daniel Previl
(74) *Attorney, Agent, or Firm* — Boudwin Intellectual Property; Daniel Boudwin (57) ABSTRACT

An electronic motorcycle helmet. The electronic motorcycle helmet includes a helmet having an aperture therein that can receive a head therethrough. A visor is disposed on a front side of the helmet and a display is disposed on an interior surface of the visor. A microprocessor, including a logic that receives a command input directed to one of a plurality of subsystems, toggles the subsystem between an activated state and a deactivated state, and displays a status window on the display corresponding to the subsystem. The plurality of subsystems includes a plurality of cameras disposed about the helmet, wherein each of the cameras is operably connected to the display and can apply a low-light filter for low-light conditions. Other subsystems include a wireless transmitter to wirelessly communicate with an external device, a GPS system, and a battery disposed at a lower edge of the rear side.

20 Claims, 5 Drawing Sheets

(51) Int. Cl.

| | | |
|---|---|---|
| *A42B 3/22* | (2006.01) | |
| *A42B 3/30* | (2006.01) | |
| *A42B 3/28* | (2006.01) | |
| *A62B 7/10* | (2006.01) | |
| *A62B 18/08* | (2006.01) | |
| *H04N 5/232* | (2006.01) | |
| *G06F 3/16* | (2006.01) | |
| *H04R 1/02* | (2006.01) | |
| *H04R 1/32* | (2006.01) | |
| *H04R 1/10* | (2006.01) | |
| *H04N 5/225* | (2006.01) | |
| *H04N 5/247* | (2006.01) | |
| *H04R 3/00* | (2006.01) | |

(52) U.S. Cl.
CPC ..... *H04N 5/23206* (2013.01); *H04N 5/23293* (2013.01); *H04R 1/028* (2013.01); *H04R 1/1033* (2013.01); *H04R 1/1041* (2013.01); *H04R 1/326* (2013.01); *H04N 5/247* (2013.01); *H04R 3/005* (2013.01); *H04R 2420/07* (2013.01)

(56) References Cited

U.S. PATENT DOCUMENTS

| | | | |
|---|---|---|---|
| 2008/0130271 A1 | 6/2008 | Harris | |
| 2011/0231977 A1* | 9/2011 | Rupnick | A42B 3/286 2/7 |
| 2013/0128046 A1 | 5/2013 | Gindin | |
| 2013/0305437 A1* | 11/2013 | Weller | A42B 3/0406 2/422 |
| 2014/0167986 A1* | 6/2014 | Parada | G01C 21/365 340/905 |
| 2016/0241794 A1* | 8/2016 | Lee | H04N 1/00204 |
| 2017/0131762 A1* | 5/2017 | Liang | A42B 3/0433 |
| 2018/0249087 A1* | 8/2018 | Arnold | G06F 3/16 |

* cited by examiner

ELECTRONIC MOTORCYCLE HELMET

CROSS REFERENCE TO RELATED APPLICATIONS

This application claims the benefit of U.S. Provisional Application No. 62/400,659 filed on Sep. 28, 2016. The above identified patent application is herein incorporated by reference in its entirety to provide continuity of disclosure.

BACKGROUND OF THE INVENTION

The present invention relates to motorcycle helmets. Specifically, the present invention relates to electronic motorcycle helmets having a plurality of subsystems to provide an augmented reality display.

Many individuals ride motorcycles and are required by law in many states to wear motorcycle helmets. While providing increased protection, motorcycle helmets can reduce a user's range of motion and can decrease the visibility of the surrounding area. This can lead to serious injury as a user may not notice a vehicle or other obstacle, potentially leading to the user causing an accident. Additionally, traditional motorcycle helmets limit the hearing of a user, further contributing to a potential accident. Furthermore, while riding a motorcycle, additional features such as GPS and radio can be difficult to use due to road noise and the need to focus on the road. Therefore, a motorcycle helmet that allows a user to have a panoramic view of his surroundings while providing a variety of other features, such as GPS and radio is desired.

In light of the devices disclosed in the known art, it is submitted that the present invention substantially diverges in design elements from the known art and consequently it is clear that there is a need in the art for an improvement to existing motorcycle helmets. In this regard, the instant invention substantially fulfills these needs.

SUMMARY OF THE INVENTION

In view of the foregoing disadvantages inherent in the known types of motorcycle helmets now present in the prior art, the present invention provides a motorcycle helmet wherein the same can be utilized for providing convenience for the user when riding a motorcycle.

The present system comprises a helmet having an aperture therein configured to receive a head therethrough, wherein the helmet includes a visor disposed on a front side of the helmet. A display is disposed on an interior surface of the visor. A microprocessor having a logic configured to receive a command input directed to one of plurality of subsystems, toggle the subsystem between an activated state and a deactivated state, and display a status window on the display corresponding to the subsystem. The plurality of subsystems include a pair of cameras disposed on each of a pair of opposing lateral sides of the helmet and a third camera disposed on a rear side of the helmet, wherein each of the cameras is operably connected to the display and is configured to apply a low-light filter for low-light conditions. Other subsystems include a wireless transceiver configured to wirelessly communicate with an external device, a GPS system configured to track the location of the helmet, and a battery disposed at a lower edge of the rear side of the helmet, the battery configured to provide power to the plurality of subsystems. In some embodiments, the plurality of subsystems further comprise an air intake disposed on the front side of the helmet. In another embodiment, the air intake is configured to move between an open position and a closed position, wherein air is forced through a filter disposed on the front side of the helmet when the air intake is in the closed position. In other embodiments, the plurality of subsystems further comprises an air outtake disposed on the rear side of the helmet. In yet another embodiment, the plurality of subsystems further comprises a solar panel disposed on an upper surface of the helmet, the solar panel electrically connected to the battery. In some embodiments, a charging cable is disposed on the rear side of the helmet, the charging cable configured to electrically connect the battery to an external power source. In another embodiment, the plurality of subsystems further comprises a plurality of sensors, each disposed about the pair of cameras and the third camera, the plurality of sensors configured to detect the presence of a vehicle in the proximity of the helmet. In other embodiments, the plurality of sensors are configured to detect a vehicle approaching the helmet above a set rate of speed. In yet another embodiment, the command input comprises a voice command issued by the wearer of the helmet. In some embodiments, the command input comprises a signal received from a remote device. In another embodiment, the visor is pivotally affixed to the helmet, such that the visor can selectively move between a raised position and a lowered position, wherein an opening is formed in the front side of the helmet when the visor is in the raised position. In other embodiments, the plurality of subsystems further comprise at least one omnidirectional microphone disposed on the pair of opposing lateral sides of the helmet, wherein the omnidirectional microphone is configured to transmit a received signal to the wearer of the helmet. In yet another embodiment, a two-way switch is disposed on one of the pair of opposing lateral sides is configured to adjust the volume of the received signal. In some embodiments, an external speaker is disposed on the front side of the helmet, the external speaker is configured to amplify speech from within the helmet. In another embodiment, a plurality of nodules are disposed along an upper surface of the helmet, wherein the nodules are configured to store at least one subsystem therein. In other embodiments, the plurality of subsystems further comprises an accelerometer configured to determine a current speed, wherein the display is further configured to display the current speed of the helmet. In yet another embodiment, the helmet further comprises a reflective strip adjacent to the solar panel and extending about the circumference of the helmet. In some embodiments, the reflective strip further comprises a plurality of light sources configured to illuminate when a light sensor within the solar panel detects low-light conditions. In another embodiment, the helmet further comprise a plurality of indicator lights disposed along a lower edge of one of the opposing lateral sides of the helmet, the indicator lights configured to display the current level of charge in the battery. In other embodiments, the visor further comprises a polarized coating configured to provide ultraviolet protection and prevent glare.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the electronic motorcycle helmet. The figures are intended for representative purposes only and should not be considered to be limiting in any respect.

Figure 1A:
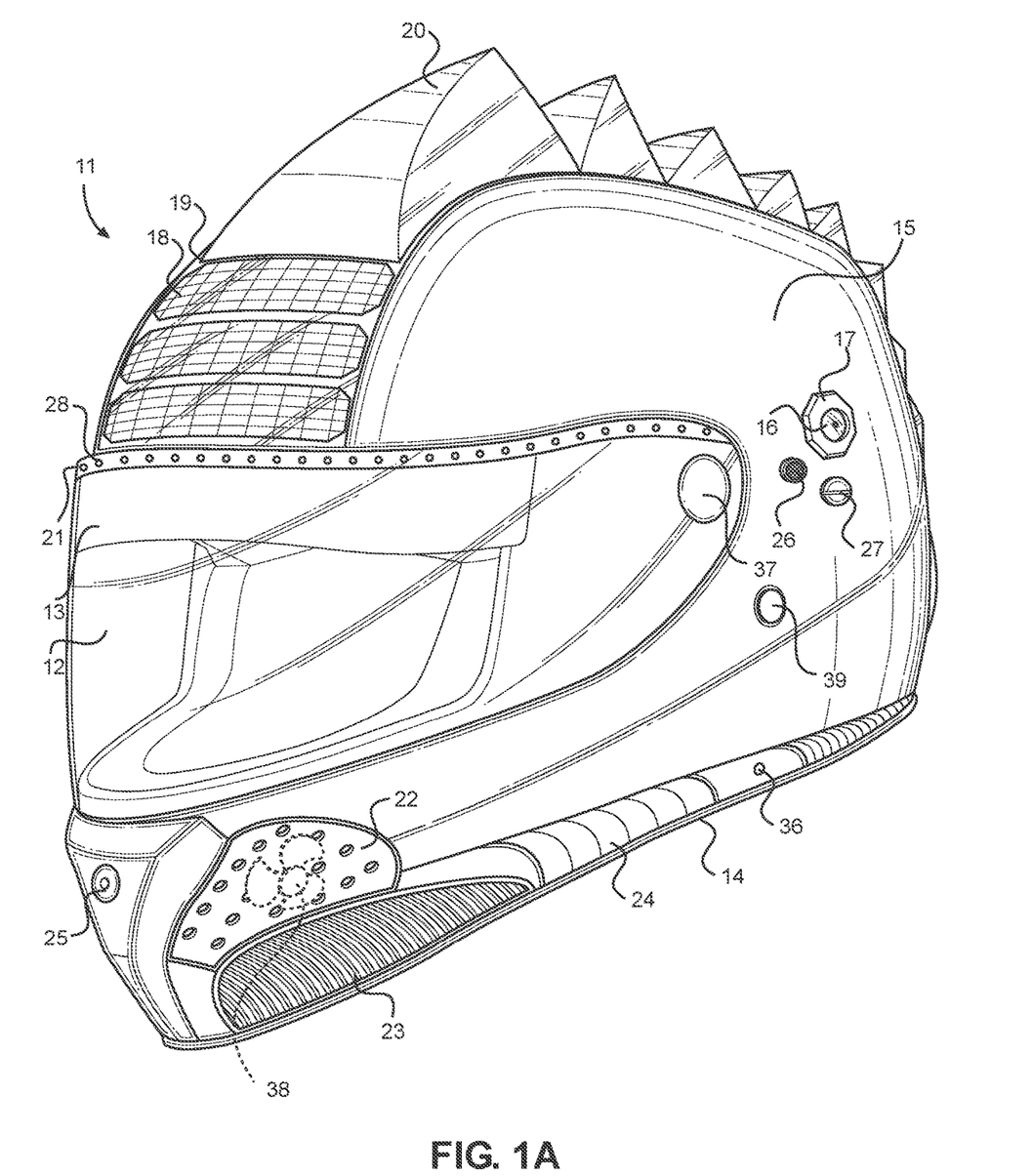
FIG. 1A shows a perspective view of an embodiment of the electronic motorcycle helmet.
Figure 1B:
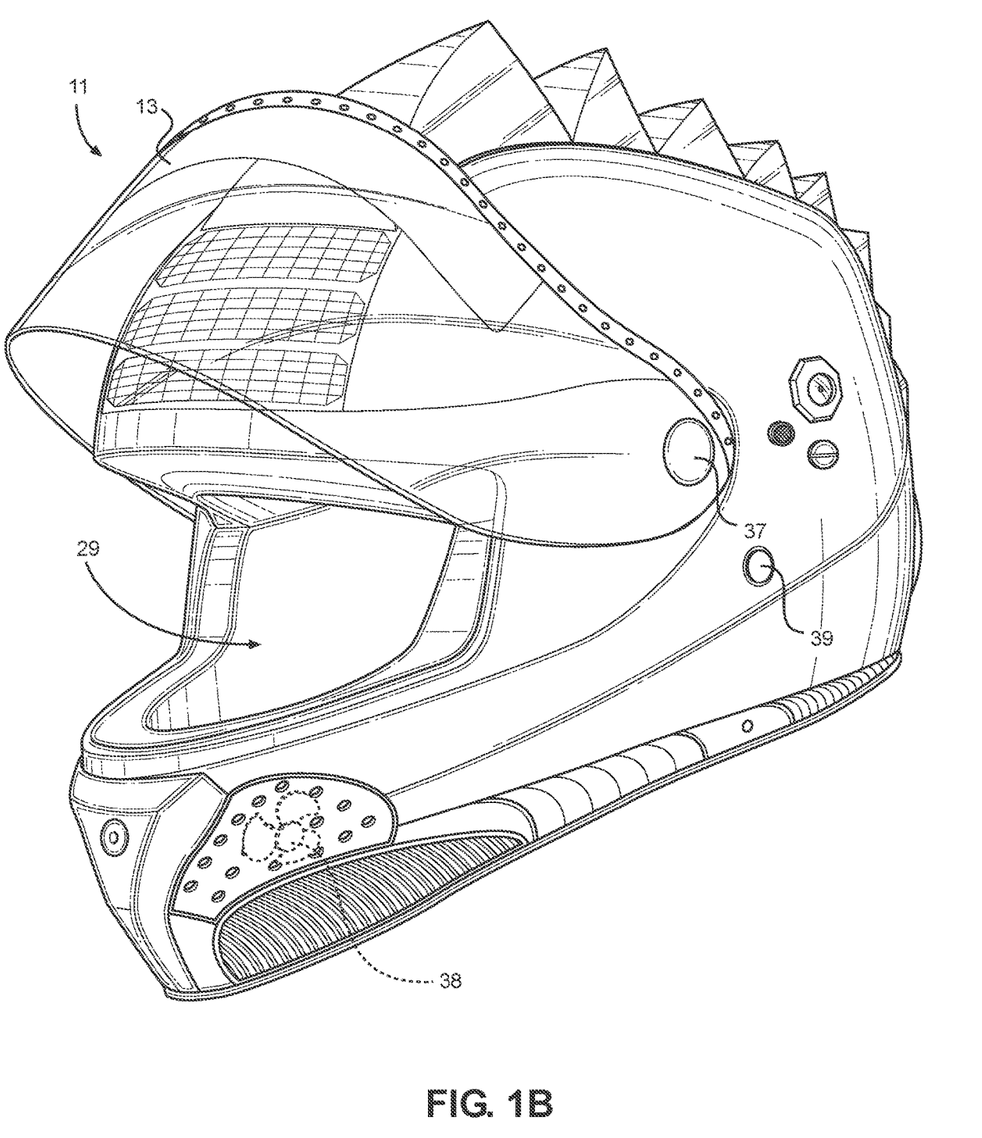
FIG. 1B shows a perspective view of an embodiment of the electronic motorcycle helmet with an open visor.

Referring now to FIGS. 1A and 1B, there are shown a perspective view of an embodiment of the electronic motorcycle helmet and a perspective view of an embodiment of the electronic motorcycle helmet with an open visor, respectively. The electronic motorcycle helmet comprises a helmet 11 having an aperture 14 configured to receive a head therethrough. In some embodiments, the helmet 11 further comprises shielding against harmful radio waves, such as a Faraday cage. In additional embodiments, the helmet 11 comprises a waterproof coating to prevent water from damage to the electronic components therein, as well as preventing water from seeping into the interior of the helmet 11. A visor 13 is disposed on a front side 12 of the helmet 11. In the illustrated embodiment, the visor 13 is pivotally affixed to the helmet 11 at opposing rear ends 37 of the visor 13. The visor 13 is configured to selectively move between a raised position as shown in FIG. 1B, and a lowered position as shown in FIG. 1A. In the raised position, the visor 13 reveals an opening 29 disposed within the front side 12, the opening 29 allowing access to the interior of the helmet 11. In this way, a user can open and close the visor 13 as desired to provide the user with an analog view of the surroundings. In some embodiments, the visor 13 further comprises a polarized coating configured to prevent glare, and protect against ultraviolet light. In this way, the visor 13 provides eye protection to the user. In an alternate embodiment, the visor 13 further comprises a water and fog resistant coating to prevent the view of the user from being obscured.

Figure 4:
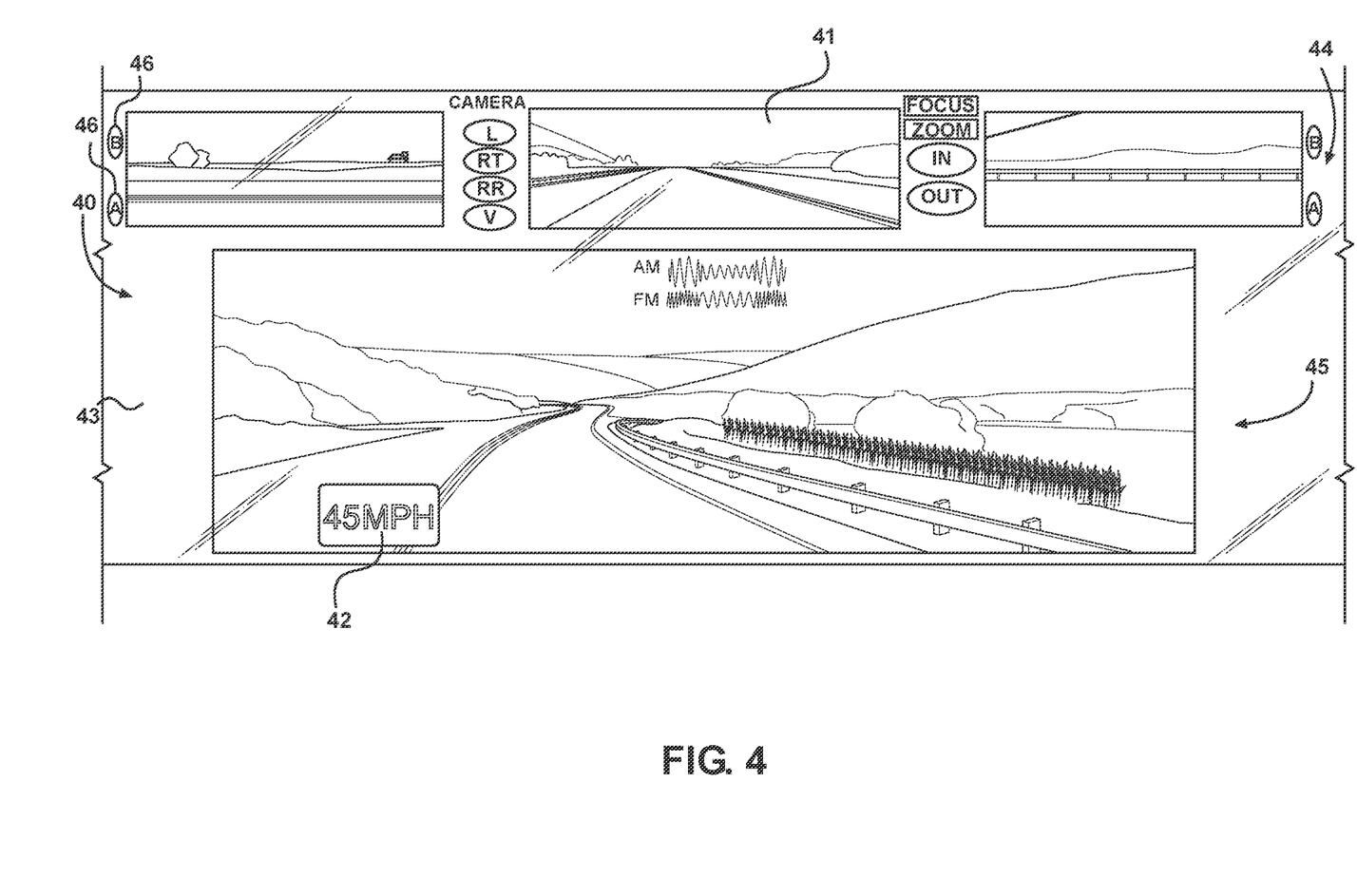
FIG. 4 shows a perspective view of the display of an embodiment of the electronic motorcycle helmet.

The helmet 11 further comprises a pair of cameras 16 disposed on opposing lateral sides 15 of the helmet 11. In the illustrated embodiment, the cameras 16 are disposed at eye level of a user wearing the helmet 11. The pair of cameras 16 are operably connected to a display (as shown in FIG. 4, 40) disposed on an interior surface of the visor 13 such that the pair of cameras 16 are configured to display a video feed on the display. The pair of cameras 16 are further configured to selectively apply a low-light filter to the video feed to provide a user greater visibility in low-light conditions. In alternate embodiments, the pair of cameras 16 are further configured to apply an infrared filter. In some embodiments, the pair of cameras 16 are configured to adjust the focus and provide zoom functionality to the user.

In the illustrated embodiment, the helmet 11 further comprises a plurality of sensors 17 disposed about the pair of cameras 16, the plurality of sensors 17, such as a proximity sensor configured to detect the presence of a vehicle in the blind spots of each of the cameras 16. In an alternate embodiment, the plurality of sensors 17 are further configured to detect the presence of a vehicle approaching the blind spots of each of the cameras 16 above a set speed. In this way, the user can be alerted to the presence or approach of a vehicle within the areas not currently visible to the user.

Figure 2:
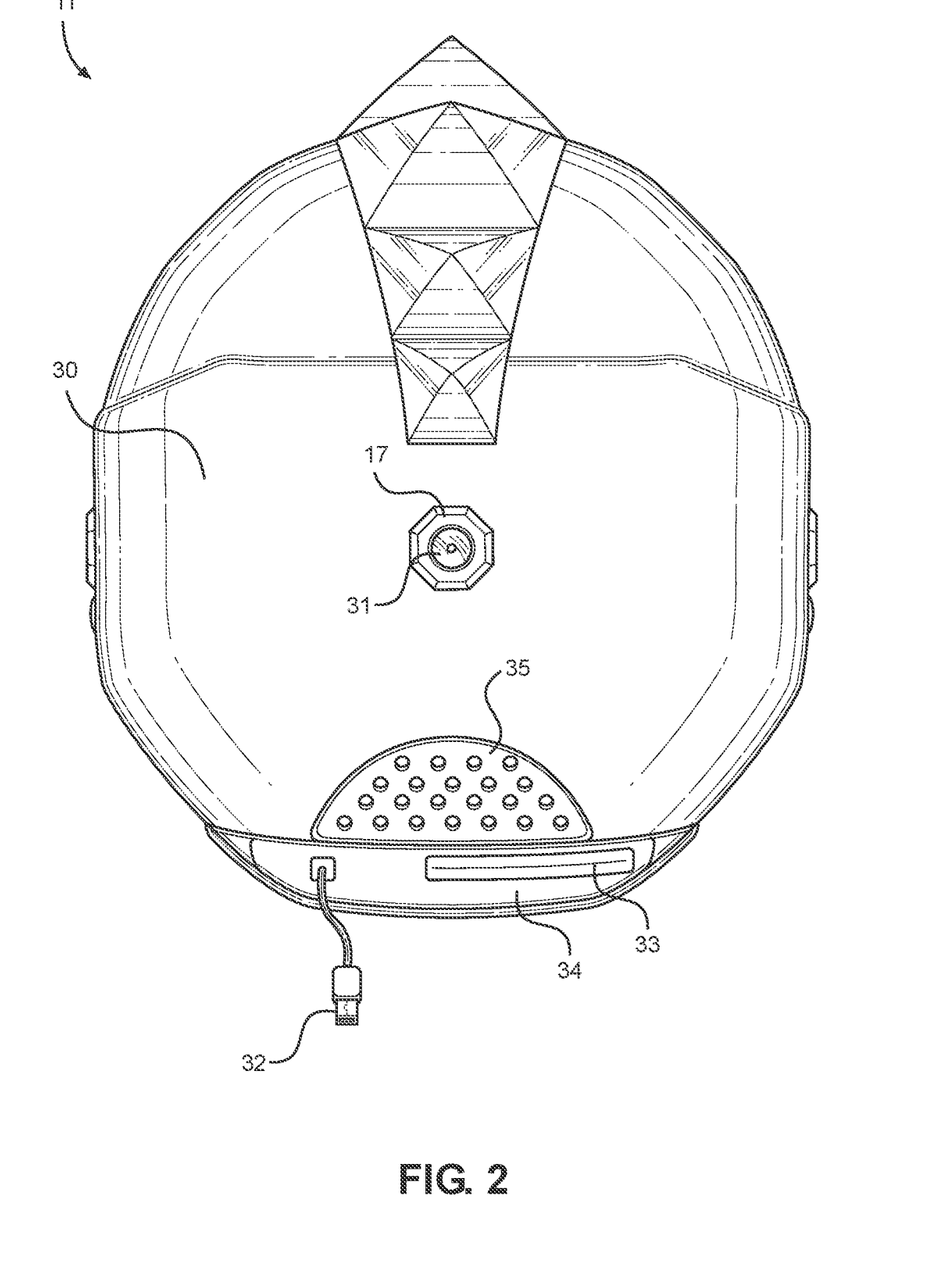
FIG. 2 shows a rear view of an embodiment of the electronic motorcycle helmet.

A solar panel 18 is disposed on an upper surface 19 of the helmet 11, the solar panel 18 operably connected to a battery (as shown in FIG. 2, 33) such that the energy produced by the solar panel 18 can be used to provide charge to the battery. In some embodiments, the solar panel 18 further comprises a light sensor configured to detect the presence of light above a threshold. A reflective strip 21 is disposed on the visor 13 and is configured to reflect light to indicate the presence of the user to other drivers. The light sensor is operably connected to a plurality of light sources 28 disposed within the reflective strip 21 on the visor 13 such that the plurality of light sources 28 illuminate when the light level is below the threshold. In this way, the presence of the user is indicated to other drivers in both low-light conditions and high-light conditions by the plurality of light sources 28 and the reflective strip 21, respectively. Additionally, the helmet 11 further comprises an activation button disposed on one of the opposing lateral sides 15 of the helmet 11. The activation button is configured to providing power to the helmet 11 when actuated. In some embodiments, the helmet 11 further comprises a power button 39 disposed on one of the opposing lateral sides 13, wherein the power button 39 is configured to activate the helmet 11 when actuated.

In the illustrated embodiment, the helmet 11 further comprises an omnidirectional microphone 26 disposed on opposing lateral sides 15 of the helmet 11, wherein the omnidirectional microphone 26 is configured to receive audio input and transmit that audio input to the wearer of the helmet 11. In this way, the user can hear the sounds outside of the helmet 11 unmuffled, resulting in a safer driving experience as the user can better react to the surroundings. In the illustrated embodiment, a two-way switch 27 is disposed on one of the opposing lateral sides 15 and is configured to vary the volume of the audio input received by the omnidirectional microphone 26 such that the user can increase or decrease the volume of the surroundings heard within the helmet 11. Similarly, an external speaker 25 is disposed on the front side 12 of the helmet 11, wherein the external speaker 25 is configured to transmit audio from within the helmet 11 to the surroundings. In this way, the voice of the user is unmuffled, allowing the user to easily converse with another person without removing the helmet 11. In some embodiments, the external speaker 25 further includes an omnidirectional microphone therein, such that another person in front of the user is clearly heard within the helmet 11.

Figure 3:
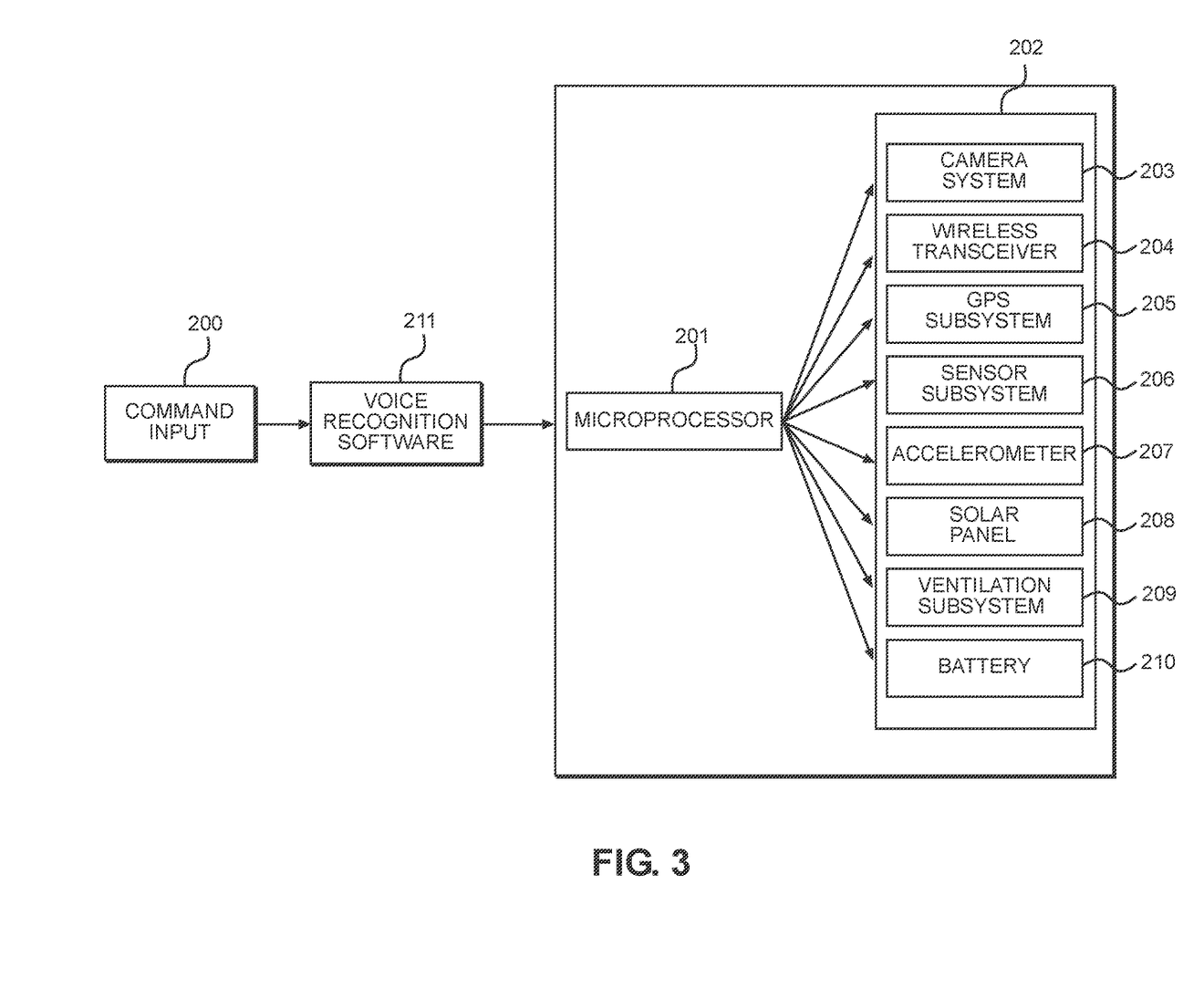
FIG. 3 shows a schematic view of the control circuit of an embodiment of the electronic motorcycle helmet.

In the illustrated embodiment, the helmet 11 further comprises a plurality of indicator lights 24 disposed along a lower edge (as shown in FIG. 2, 34) of the helmet 11. The plurality of indicator lights 24 are operably connected to the battery and are configured to display the current level of charge in the battery via sequentially illuminating an increasing number of the plurality of indicator lights 24 corresponding to increasing levels of charge within the battery. The plurality of indicator lights 24 can comprise a variety of colors, and in some embodiments, alternating colors. In some embodiments, the plurality of indicator lights 24 comprise independent status indicators for power usage across the helmet, such as battery charge status, solar power usage, and external charge status. In the illustrated embodiment, an emergency button 36 is disposed along the lower edge of the helmet 11 adjacent to the plurality of indicator lights 24, wherein the emergency button 36 is operably connected to a wireless transceiver (as shown in FIG. 3, 204) and is configured to alert emergency services when actuated. In some embodiments, the emergency button 36 is further configured to transmit the location of the helmet 11 to emergency services, wherein the location is determined by a GPS subsystem (as shown in FIG. 3, 205).

In the illustrated embodiment, the helmet 11 further comprises a plurality of nodules 20 disposed centrally along the upper surface 19 of the helmet 11 and extend onto a rear side of the helmet 11. The plurality of nodules 20 are configured to provide an aerodynamic profile to reduce drag produced by the helmet 11 at high speeds. In the illustrated embodiment, the plurality of nodules 20 comprise a pyramid shape, wherein a front face of the pyramid sweeps towards a rear face of the pyramid, such that the front face provides minimal drag. In alternate embodiments, the plurality of nodules can comprise alternate aerodynamic profiles, such as domes or swept ridges. Furthermore, the plurality of nodules 20 are configured to store electronic components required for the operation of a plurality of subsystems (as shown in FIG. 3, 202), such as the wireless transceiver. In this way, the plurality of nodules 20 allow the helmet 11 to include a wide array of electronics while minimizing drag caused by the increased storage requirements of the electronics.

In the illustrated embodiment, the helmet 11 further comprises an air intake 22 disposed on the front side 12 of the helmet 11. The air intake 22 is configured to feed air into the interior of the helmet 11. In some embodiments, the air intake 22 further comprises a fan 38 disposed therein, the fan 38 configured to force air into the interior of the helmet 11 to aid in the ventilation thereof. In the illustrated embodiment, the helmet 11 further comprises a filter 23, wherein the filter 23 is configured to prevent distracting or harmful odors from entering the helmet 11. In some embodiments, the air intake 22 is configured to move between an open position and a closed position, wherein air is prevented from entering the helmet 11 through the air intake 22 when the air intake 22 is in the closed position. When in the closed position, air is instead forced to enter the helmet 11 through the filter 23, allowing the user to control the air quality entering the helmet 11. In this way, the user is provided additional protection against potential distractions, allowing a safer driving experience.

Referring now to FIG. 2, there is shown a rear view of an embodiment of the electronic motorcycle helmet. In the illustrated embodiment, the helmet 11 further comprises a third camera 31 disposed on a rear side 30 of the helmet 11. The third camera 31 is disposed in line with the pair of cameras to provide a panoramic view of the surroundings around the helmet 11. The third camera 31 is operably connected to the display and can further apply a low-light filter to provide the user visibility in low-light conditions. In some embodiments, the third camera 31 is further configured to apply an infrared filter. In some embodiments, the third camera 31 is configured to adjust the focus and provide zoom functionality to the user. One of the plurality of sensors 17 is disposed about the third camera 31 and provides the same functionality as described in reference to FIGS. 1A and 1B.

In the illustrated embodiment, the helmet 11 further comprises a charging cable 32 operably connected to a battery 33. The charging cable 32 is configured to electrically connect to an external power source, such as a wall outlet, cigarette lighter port, battery pack, or USB port to provide charge to the battery 33. In some embodiments, the charging cable 32 is retractably mounted within the helmet 11 such the charging cable 32 selectively moves between an extended position and a retracted position, wherein the charging cable 32 is disposed within the helmet 11 when in the retracted position. In the illustrated embodiment, the battery 33 is removably securable along the lower edge 34 of the rear side 30. The battery 33 is configured to be recharged by the charging cable 32 as well as the solar panel.

In the illustrated embodiment, the helmet 11 further comprises an air outtake 35 disposed on the rear side 30. The air outtake 35 is configured to move air from the interior of the helmet 11 to the exterior to assist in ventilation. In some embodiments, the air outtake 35 further comprises a fan disposed therein, the fan configured to force air from the interior to the exterior. In some embodiments, an omnidirectional microphone is disposed on the rear side 30, wherein the omnidirectional microphone is configured as the omnidirectional microphones of FIG. 1A.

Referring now to FIG. 3, there is shown a schematic view of the control circuit of an embodiment of the electronic motorcycle helmet. The helmet further comprises a microprocessor 201 having a logic configured to receive a command input 200, toggle one of a plurality of subsystems 202 between an activated state and a deactivated state, and display a status window corresponding to the selected subsystem 202. In this way, the user can select one of a plurality of subsystems 202 that the user desires to interact with, and issue a command input 200 to activate the selected subsystem 202, deactivate the selected subsystem 202, or display a status window on the display corresponding to the selected subsystem 202.

In some embodiments, the microprocessor 201 includes voice recognition software 211 such that the command input 200 can comprise a voice command issued by the user. The voice command can be programmed to have an activation word to indicate a desire to interact with a subsystem 202, followed by a pre-programmed response. In one use, a user can issue a command input 200 by saying the activation word "Smart" followed by a command related to one of the plurality of subsystems 202, such as "Smart Radio 100.3 FM" to activate a wireless transceiver 204 to tune to the desired radio station. In some embodiments, the microprocessor 201 is configured to issue an audible confirmation upon receipt of a command input 200, such as a verbal acknowledgement to the wearer of the helmet indicating the command input 200 has been received. In another embodiment, the command input 200 can comprise a signal received from a remote device, such as a smartphone or tablet. In this way, a user can activate, deactivate, and change status window displays from the remote device, such as via an application installed thereon.

In the illustrated embodiment, one of the plurality of subsystems 202 comprises the camera system 203. The camera system 203 comprises the pair of cameras and the third camera and is configured to send a video input to the display to display the surroundings around the helmet. The status window displayed by the camera system 203 comprises individual view of each video feed along the display. In this way, the camera system 203 provides the user with a panoramic view of the surroundings. In some embodiments, the camera system 203 comprises additional features, allowing the each of the cameras to zoom, focus, and apply various filters including low-light and infrared. In alternate embodiments, the camera subsystem 203 further comprises facial recognition software configured to identify a person in view of the cameras based upon facial characteristics. In this way, the camera subsystem 203 can be tied into a database allowing law enforcement to readily identify any persons of interest in the vicinity.

In the illustrated embodiment, the plurality of subsystems 202 further comprises a wireless transceiver 204 configured to wirelessly communicate with an external device. In this way, the wireless transceiver 204 can receive AM radio, FM radio, satellite radio, and can wirelessly connect to an electronic device, such as a smartphone, allowing the user to receive and transmit phone and video calls.

The plurality of subsystems 202 further comprise a GPS subsystem 205 configured to triangulate the position of the helmet relative to the surroundings and display the current location of the helmet on the display. The GPS subsystem 204 is further configured to allow a user to select a destination and direct the user to the selected location. The status window corresponding to the GPS subsystem 204 includes a map showing the location of the user relative to the desired location.

The sensor subsystem 206 is configured to detect the presence of a vehicle currently in a blind spot of the camera system 203 and display the presence of a vehicle with a blind spot indicator (as shown in FIG. 4, 46) on the display. Additionally, the sensor subsystem is configured to detect a vehicle approaching a camera blind spot above a set rate of speed relative to the current speed of the helmet. In some embodiments, the set rate of speed comprises a range of speeds to account for standard variations in speed due to traffic, such as 5-15 MPH relative to the speed of the helmet. In this way, the user can be informed of the approach or the presence of a vehicle in the immediate area. In the illustrated embodiment of FIG. 4, the blind spot indicators 46 comprise a pair of indicators, wherein one of the pair of indicators is configured to flash or steadily illuminate when a vehicle is currently occupying the blind spot of the camera system 203, and the other indicator is configured to flash or steadily illuminate when a vehicle is approaching the blind spot of the camera system 203 above a set rate of speed.

Additional subsystems 202 include an accelerometer 207 configured to detect the current speed of the helmet and display the current speed on the display. In this way, the user can easily read the current speed without taking attention away from the road to look at a gauge on the vehicle. The plurality of subsystems 202 further comprises a solar panel 208 configured to receive solar energy and transmit charge to the battery subsystem 210. The display is configured to display the activation status of the solar panel 208 and the current charge level of the battery 210. The ventilation subsystem 209 is configured to display the status of the air intake and the air outtake, as well as toggle the air intake between an open position and a closed position. This allows a user to selectively force air through the filter to eliminate toxins or offensive odors. In some embodiments, the helmet includes a temperature sensor configured to report the current temperature to the display. In some embodiments, the plurality of subsystems 202 further comprise a hygrometer and thermometer system configured to display the current weather and temperature of the surrounding area on the display. In another embodiment, the subsystems 202 further comprise a retinal scanning system configured to scan the retinas of a user wearing the helmet and compare the scan to a registered retinal pattern, wherein the microprocessor is configured to prevent command inputs from being processed until the user is verified. In other embodiments, the retinal scanning system is configured to identify persons of interest external to the helmet via the camera subsystem 203.

Referring now to FIG. 4, there is shown a perspective view of the display of an embodiment of the electronic motorcycle helmet. A display 40 is disposed on an interior surface 43 of the visor. The display 40 is configured to display an augmented reality view, superimposing a computer-generated image over a live image in order to create a composite view of the view a user would see through the visor. In some embodiments, the display 40 utilizes a forward mounted camera disposed on the front of the helmet, wherein the camera is configured as the pair of cameras and the third camera, allowing the augmented reality view of the display 40 to apply various filters and functions, such as zooming and focusing. In the illustrated embodiment, the display 40 comprises an upper portion 44 and a lower portion 45, wherein the upper portion is configured to display a plurality of status windows 41 corresponding to the plurality of subsystems that the user has activated for display. In the illustrated embodiment, the plurality of status windows 41 currently display the view of the pair of cameras and the third camera, providing a panoramic view of the surroundings about the helmet. Additionally, the blind spot indicators 46 corresponding to the sensor subsystem are displayed. The upper portion 44 can comprise a variety of status windows 41, each corresponding to the status of one of the plurality of subsystems, and can be selected for display via a corresponding command input. In the illustrated embodiment, the lower portion 45 further comprises a speedometer 42 showing the current speed as determined by the accelerometer. In this way, the display 40 provides a user with an augmented reality view having all necessary information to maintain safety when driving.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. An electronic motorcycle helmet, comprising:
   a helmet having an aperture therein configured to receive a head therethrough;
   a visor disposed on a front side of the helmet;
   a display disposed on an interior surface of the visor;
   a microprocessor having a logic configured to:
      receive a command input directed to one of a plurality of subsystems;
      toggle the subsystem between an activated state and a deactivated state;

display a status window on the display corresponding to the subsystem;
wherein the plurality of subsystems comprises:
a pair of cameras each disposed on opposing lateral sides of the helmet;
a third camera disposed on a rear side of the helmet;
wherein each of the pair of cameras and third camera is operably connected to the display;
a wireless transceiver configured to wirelessly communicate with an external device;
a GPS system configured to track the location of the helmet;
an air intake disposed on the front side of the helmet;
wherein the air intake is configured to move between an open position and a closed position, wherein air is forced through a filter disposed on the front side of the helmet when the air intake is in the closed position;
a battery configured to provide power to the plurality of subsystems.

2. The electronic motorcycle helmet of claim 1, wherein the plurality of subsystems further comprises an air outtake disposed on the rear side of the helmet.

3. The electronic motorcycle helmet of claim 1, wherein the plurality of subsystems further comprises a solar panel disposed on an upper surface of the helmet, the solar panel electrically connected to the battery.

4. The electronic motorcycle helmet of claim 1, further comprising a charging cable disposed on the rear side of the helmet, the charging cable configured to electrically connect the battery to an external power source.

5. The electronic motorcycle helmet of claim 1, wherein the plurality of subsystems further comprises a plurality of sensors, each disposed about the pair of cameras and the third camera, the plurality of sensors configured to detect the presence of a vehicle in the proximity of the helmet.

6. The electronic motorcycle helmet of claim 5, wherein the plurality of sensors are further configured to detect a vehicle approaching the helmet above a set rate of speed.

7. The electronic motorcycle helmet of claim 1, wherein the command input comprises a voice command issued by a wearer of the helmet.

8. The electronic motorcycle helmet of claim 1, wherein the command input comprises a signal received from a remote device.

9. The electronic motorcycle helmet of claim 1, wherein the visor is pivotally affixed to the helmet, such that the visor can selectively move between a raised position and a lowered position, wherein an opening is formed in the front side of the helmet when the visor is in the raised position.

10. The electronic motorcycle helmet of claim 1, wherein the plurality of subsystems further comprises at least one omnidirectional microphone disposed on the pair of opposing lateral sides of the helmet, wherein the omnidirectional microphone is configured to transmit a received signal to a wearer of the helmet.

11. The electronic motorcycle helmet of claim 10, wherein a two-way switch disposed on one of the pair of opposing lateral sides is configured to adjust the volume of the received signal.

12. The electronic motorcycle helmet of claim 1, wherein an external speaker is disposed on the front side of the helmet, the external speaker configured to amplify speech from within the helmet.

13. The electronic motorcycle helmet of claim 1, further comprising a plurality of nodules disposed along an upper surface of the helmet, wherein the nodules are configured to store at least one subsystem therein.

14. The electronic motorcycle helmet of claim 1, wherein the plurality of subsystems further comprises an accelerometer configured to determine a current speed, wherein the display is further configured to display the current speed of the helmet.

15. The electronic motorcycle helmet of claim 1, wherein the helmet further comprises a reflective strip adjacent to a solar panel and extending about the circumference of the helmet.

16. The electronic motorcycle helmet of claim 15, wherein the reflective strip further comprises a plurality of light sources configured to illuminate when a light sensor within the solar panel detects low-light conditions.

17. The electronic motorcycle helmet of claim 1, wherein the helmet further comprises a plurality of indicator lights disposed along a lower edge of one of the opposing lateral sides of the helmet, the indicator lights configured to display the current level of charge in the battery.

18. The electronic motorcycle helmet of claim 1, wherein the visor further comprises a polarized coating configured to provide ultraviolet protection and prevent glare.

19. The electronic motorcycle helmet of claim 1, further comprising a reflective strip disposed along an upper edge of the visor, the reflective strip configured to reflect light to increase visibility of the helmet.

20. The electronic motorcycle helmet of claim 19, wherein a plurality of light sources are disposed within the reflective strip, wherein the plurality of light sources are configured to illuminate when a light sensor disposed within the solar panel detects low-light conditions.

* * * * *